United States Patent
Predtechenskiy

(10) Patent No.: US 11,292,720 B2
(45) Date of Patent: *Apr. 5, 2022

(54) METHOD AND APPARATUS FOR PRODUCING CARBON NANOSTRUCTURES

(71) Applicant: MCD Technologies S.a r.l., Leudelange (LU)

(72) Inventor: Mikhail Rudolfovich Predtechenskiy, Novosibirsk (RU)

(*) Notice: Subject to any disclaimer, the term of this patent is extended or adjusted under 35 U.S.C. 154(b) by 200 days.

This patent is subject to a terminal disclaimer.

(21) Appl. No.: 16/845,505

(22) Filed: Apr. 10, 2020

(65) Prior Publication Data
US 2020/0239316 A1    Jul. 30, 2020

Related U.S. Application Data

(63) Continuation-in-part of application No. 14/655,783, filed as application No. PCT/RU2012/001053 on Jan. 22, 2013, now abandoned.

(51) Int. Cl.
*C01B 32/162* (2017.01)
*C01B 32/159* (2017.01)

(52) U.S. Cl.
CPC .......... *C01B 32/162* (2017.08); *C01B 32/159* (2017.08); *C01B 2202/02* (2013.01); *C01B 2202/34* (2013.01); *C01P 2002/82* (2013.01); *C01P 2002/88* (2013.01); *C01P 2004/04* (2013.01)

(58) Field of Classification Search
CPC . C01B 32/162; C01B 32/159; C01B 2202/02; C01B 2202/34; C01B 32/16; C01B 31/0206; C01B 31/0226; C01P 2002/82; C01P 2002/88; C01P 2004/04; C01P 2004/16; B82Y 40/00; B82Y 30/00; C09C 1/56; C09C 1/48; B22F 9/12; B22F 2202/13; B22F 2999/00; B22F 2005/002; B01J 19/126; B01J 2219/0879; B01J 2219/0871; B01J 2219/0894; B01J 2219/0847; B01J 23/74; H05H 1/46;
(Continued)

(56) References Cited

U.S. PATENT DOCUMENTS

| | | | | |
|---|---|---|---|---|
| 2007/0224107 A1* | 9/2007 | Hikata | ............ | C30B 25/02 423/460 |
| 2007/0266825 A1* | 11/2007 | Ripley | ............ | B82Y 30/00 75/330 |
| 2012/0219490 A1* | 8/2012 | Noda | ............ | C01B 32/164 423/447.3 |

* cited by examiner

*Primary Examiner* — Xiuyu Tai
(74) *Attorney, Agent, or Firm* — Bardmesser Law Group

(57) ABSTRACT

Method for producing single wall carbon nanotubes, including obtaining a vapor containing nanoparticles of a catalytic substance in an evaporation chamber; obtaining a working mixture in a mixing node at 650-1,400° C. by delivering the vapor to the mixing node from the evaporation chamber in a carrier gas flow, and introducing gaseous hydrocarbons into the mixing node so that the working mixture includes the carrier gas, hydrocarbons, and the nanoparticles, with the nanoparticles having an average size of 1-10 nm, and single wall carbon nanotubes forming on the nanoparticles; feeding the working mixture at 650-1,400° C. to the reaction chamber, the reaction chamber having a distance of at least 0.5 m between its opposite walls; discharging the single wall carbon nanotubes from the reaction chamber in a stream of gaseous products of hydrocarbon decomposition; filtering the single wall carbon nanotubes from the gaseous products of hydrocarbon decomposition.

14 Claims, 9 Drawing Sheets

(58) Field of Classification Search
CPC . H01J 37/3244; H01J 37/32055; D01F 9/127;
Y10S 977/843
See application file for complete search history.

METHOD AND APPARATUS FOR PRODUCING CARBON NANOSTRUCTURES

CROSS-REFERENCE TO RELATED APPLICATION

This application is a continuation in part of U.S. patent application Ser. No. 14/655,783, filed on Jun. 26, 2015, which is a US National Phase of PCT/RU2012001053, international filing date Jan. 22, 2013.

BACKGROUND OF THE INVENTION

Field of the Invention

The present invention relates to a method and apparatus for producing the single wall carbon nanotubes by the catalytic decomposition of hydrocarbons.

Description of the Related Art

Recently, there has been a surge of interest in extended carbon nano structures in connection with the prospects of obtaining novel materials with unique properties on their basis. Extended (cylindrical) carbon nano structures include carbon nanotubes of various types that differ in their structure, diameter, chirality, number of layers (single wall, double wall, multiwall), as well as carbon nanofibers [Nazaro Martin, Dirk M. Guldi, Luis Echegoyen, Carbon Nanostructures—Introducing the Latest Web Themed Issue. ChemComm 2011, 47, 604-605]. A carbon nanotube has an ordered structure and is a hollow cylinder formed by one or several monocrystalline planes of graphene [Dresselhaus, M. S., Dresselhaus, G., & Jorio, A. Annual Review of Materials Research, 2004, 34(1), 247-278]. In contrast to this, carbon nanofibers have a disordered polycrystalline structure and are stacked at a certain angle relative to the fiber axis pile of graphene layers [Koyama, T. and Endo, M. T. Structure and Growth Processes of Vapor-Grown Carbon Fibers. 1973, 42, 690].

As a result, the properties of carbon nanotubes, in particular single wall nanotubes, are far superior to the properties of carbon nanofibers, which justifies their classification as a separate category. This is explained by the fact that the graphene layer forming the wall (framework) of the nanotube along its entire length has high tensile strength, thermal and electrical conductivity [Yu, M. Strength and Breaking Mechanism of Multiwalled Carbon Nanotubes Under Tensile Load. Science, 2000, 287(5453), 637-640]. In contrast, transitions in carbon nanofibers from one graphene layer to another are encountered when moving along the wall. The presence of inter-layer contacts and high defect rates of nanofiber structures significantly deteriorate their physical and mechanical properties [Endo, M., Kim, Y., Hayashi, T., Nishimura, K., Matusita, T., Miyashita, K., & Dresselhaus, M. Carbon, 2001, 39(9), 1287-1297].

An economically justified technology for obtaining carbon nanofibers was suggested by Japanese researchers [Koyama, T. and Endo, M. T. Method for Manufacturing Carbon Fibers by a Vapor Phase Process, Japanese Patent 1982-58, 966, 1983] and then developed well [Tibbetts, G. G. Lengths of Carbon Fibers Grown from Iron Catalyst Particles in Natural Gas, Journal of Crystal Growth, 1985, 73, 431; Benissad, F., Gadelle, P., Coulon, M., and Bonnetain, L. Formation de Fibres de Carbone a Partir du Methane: I Croissance Catalytique et Epaississement, Pyrolytique, Carbon, 1988, 26, 61-69].

In comparison to carbon nanofibers, multiwall carbon nanotubes have a better structure, representing a multitude of cylinders coaxially inserted into each other. The spacing between the graphene layers is 0.34 nm, which approximately corresponds to the distance in graphite. Furthermore, graphene layers in multiwall carbon nanotubes can be separated by transversal defects that have an adverse effect on the properties of multiwall carbon nanotubes [Kharissova, O. V., Kharisov, B. I. Variations of interlayer spacing in carbon nanotubes. RSC Adv., 2014, 4(58), 30807-30815]. Although multiwall carbon nanotubes are superior in their properties to nanofibers, this superiority is insignificant. Many companies have already implemented mass production of multiwall carbon nanotubes, which allowed them to carve out their own market niches due to their moderate cost [U.S. Pat. Nos. 8,753,602; 8,048,821; 9,133,075].

In contrast to nanofibers and multiwall carbon nanotubes, single wall carbon nanotubes, having a crystalline structure that is perfect and close to monocrystalline, are a sheet of graphene rolled into a cylinder with a diameter of about 1 to 3 nm. Such structure imparts unique properties to single wall carbon nanotubes: they are characterized by record tensile strength, electrical and thermal conductivity [Li et al., Appl. Phys. Lett., Nov. 13, 2000, Vol. 77, No. 20]. Being introduced in very low concentrations into various materials, single wall carbon nanotubes provide a qualitative improvement of their properties.

The unique properties of single wall carbon nanotubes improve performance of materials applied in various fields, as described in more detail in the Industrial Applicability section.

Taking into account that single wall carbon nanotubes are of prime technical interest due to their unique properties, we shall hereinafter focus on the production technology of single wall carbon nanotubes. A wide range of applications of single wall carbon nanotubes is the reason for numerous but unsuccessful attempts made at creating cost-effective technologies for their production based on such methods as laser ablation, arc discharge, chemical vapor deposition (CVD) [International patent publication WO 2005085130; U.S. Pat. Nos. 6,451,175; 6,422,450; 6,232,706; and 6,221, 330]. In most cases, such methods are used in laboratory settings to produce moderate amounts (grams) of single wall carbon nanotubes, which are sufficient for studying their properties only. A significant drawback of these methods is their low production rate due to a limited production of catalytic nanoparticles.

International patent publication WO 2005085130 provides a continuous method for obtaining a mixture of single wall and multiwall carbon nanotubes in laboratory settings. A specific feature of this method is the broad size distribution of catalyst nanoparticles, and their synthesis before their entering the reaction chamber. A classifier is employed to select nanoparticles of specific size, which substantially increases the cost of the method. Next, the catalyst nanoparticles, either separately or together with the gaseous hydrocarbon stream, are introduced into the reaction chamber, where a catalytic decomposition of hydrocarbon on the catalyst particles and the growth of single wall and multiwall carbon nanotubes and other carbon nanostructures take place. An essential drawback of this method is its capacity limitations, i.e., this method allows to produce single wall and multiwall carbon nanotubes in small amounts and cannot be implemented on an industrial scale. The problem is that an increase in process productivity at a given reactor size requires an increase in the number of catalyst nanoparticles supplied to the reaction chamber per unit time. However, it is impossible to stabilize particles of the same size at a high catalyst concentration in the stream. The agglomeration and coagulation of catalyst particles result in their coarsening and subsequent deactivation, or in the synthesis of multiwall carbon nanotubes and other carbon nanostructures on them. Even at relatively low particle concentrations in the stream, the authors suggest maintaining a temperature of not more than 400° C. to prevent agglomeration of catalyst particles. However, the typical temperature for the synthesis of single wall carbon nanotubes constitutes around 1,000° C., and this means that a temperature gradient exists in the reactor, which, in the case of high catalyst concentrations, will result in a variation of the key parameters of the material synthesized, and precludes the synthesis of material containing predominantly single wall carbon nanotubes.

Therefore, a scaling of the abovementioned methods up to an industrial scale is not possible. On the other hand, the scaling of production methods is essential for nearly all potential industrial applications of single wall carbon nanotubes.

It should be mentioned that the production rate of the method for synthesizing single wall carbon nanotubes is a necessary but not sufficient condition for developing large-scale applications of single wall carbon nanotubes. It is essential that the synthesized material satisfies certain quality criteria. The key quality parameters of the material containing single wall carbon nanotubes are the carbon content, the content of nanotubes, the fraction of single wall carbon nanotubes, the content of metallic impurities, the degree of crystallinity, which is characterized by the ratio of G and D modes on the Raman spectra.

Thus, existing methods for the production of single wall carbon nanotubes have certain drawbacks outlined above. It is necessary to eliminate the drawbacks of the known methods for production of single wall carbon nanotubes, and develop a relatively inexpensive but providing a high yield of high quality single wall carbon nanotubes method, to satisfy the demand of a multitude of various fields of their technological applications.

SUMMARY OF THE INVENTION

The invention solves the problem of providing a method for production of high quality single wall carbon nanotubes at an industrial scale. This is achieved by spatially separating the processes of preliminary preparation of nanoparticles containing the catalytic substance and of synthesis of single wall carbon nanotubes, implementing a method for introduction of particles containing the catalytic substance into the synthesis reactor as part of a gas mixture that ensures identical synthesis conditions throughout the entire reactor, and reducing the effect of reaction chamber walls on the process of nanotube synthesis.

Additional features and benefits of the invention will be disclosed in the description below and will, in part, become apparent from the disclosure or may be learnt when using the invention. The benefits of the invention will be implemented and realized in a structure specifically given hereinafter in the disclosure and appended claims, as well as on the accompanying drawings.

It is understood that both the foregoing general description and the detailed disclosure provided below are given by way of example and explanation only and are intended to provide an additional explanation of the invention as set forth in the appended claims.

BRIEF DESCRIPTION OF ACCOMPANYING FIGURES

The provided drawings, which are included to further aid in understanding the invention, illustrate embodiments of the invention and, together with the disclosure, serve to explain the principles of the invention.

DETAILED DESCRIPTION OF THE PREFERRED EMBODIMENTS

Figure 1:
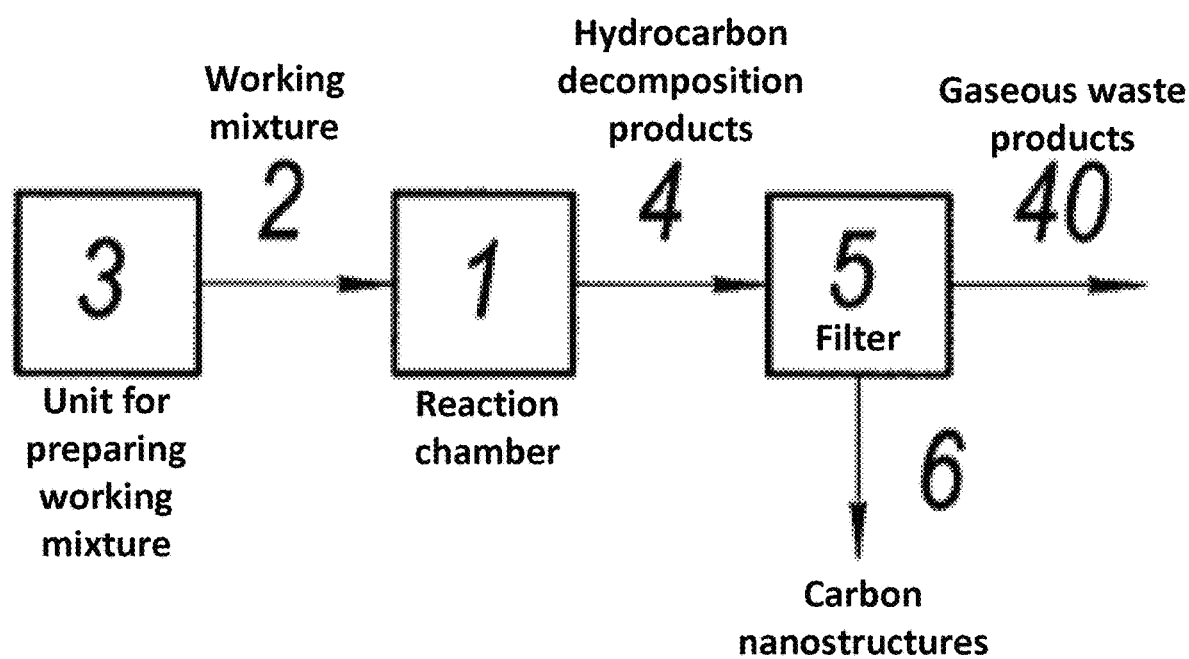
FIG. 1 shows a diagram of an embodiment of the method and of an apparatus to implement the method.

Reference will now be made in detail to the preferred embodiments of the present invention, examples of which are illustrated in the accompanying drawings.

The invention solves the problem of providing a method for production of high quality single wall carbon nanotubes at an industrial scale by spatially separating the processes of preliminary preparation of nanoparticles containing the catalytic substance and of synthesis of single wall carbon nanotubes, implementing a method for introduction of particles containing the catalytic substance into the synthesis reactor as part of a gas mixture that ensures identical synthesis conditions throughout the entire reactor, and reducing the effect of reaction chamber walls on the process of synthesis of single wall carbon nanotubes. To solve this problem, a method for producing single wall carbon nanotubes is provided, the method comprising: (a) obtaining vapors containing the catalytic substance in the evaporation chamber; (b) obtaining a working mixture in the mixing node at 650-1,400° C. by delivering the vapors containing the catalytic substance thereto from the evaporation chamber in a carrier gas flow, and introducing gaseous hydrocarbons thereto so as to have the working mixture comprise the carrier gas, hydrocarbons, and nanoparticles containing the catalytic substance, with their average size being 1-10 nm, and single wall carbon nanotubes forming thereupon; (c) feeding the working mixture at 650-1,400° C. to the reaction chamber, having a distance of at least 0.5 m between its opposite walls; (d) discharging the single wall carbon nanotubes from the reaction chamber in the stream of gaseous products of hydrocarbon decomposition; (e) isolating the single wall carbon nanotubes from the gaseous products of hydrocarbon decomposition by filtering.

Obtaining Vapors Containing the Catalytic Substance in the Evaporation Chamber

The vapors containing the catalytic substance are obtained in the evaporation chamber located in the working mixture preparation node that is spatially separated from the reaction chamber wherein the synthesis of single wall carbon nanotubes occurs.

The vapors containing the catalytic substance can be obtained by any methods known in the art, in particular but without limitation by the methods of electric arc discharge, explosion, or heating a metal wire containing the catalytic substance, by thermal decomposition of chemical compounds containing the catalytic substance, or by other methods.

The vapors containing the catalytic substance can be formed in the evaporation chamber by electric arc discharge that is formed between two electrodes, wherein at least one of the electrodes is configured as an open container and is filled with metal comprising the catalytic substance and is at least partially molten under the action of the electric arc discharge.

The electrode comprising the catalytic substance is melted and evaporates under the action of the electric arc discharge to form the vapors containing the catalytic substance. The material of the other electrode can be, e.g., graphite.

Furthermore, the vapors containing the catalytic substance can be formed in the evaporation chamber by electric arc discharge that is formed between two electrodes, each of them being configured as an open container filled with metal comprising the catalytic substance and at least partially molten under the action of the electric arc discharge. The evaporation chamber is divided into two parts, with each electrode positioned in a separate part, the parts being connected with a discharge channel to receive the plasma-forming gas that is being supplied as a vortex stream.

The plasma-forming gas is selected from the group comprising gaseous hydrocarbons, an inert gas, hydrogen, nitrogen, ammonia, or a combination of at least two thereof.

According to the preferred embodiment of the invention, vapors containing the catalytic substance and formed by evaporating a liquid or solid organometallic compound can be used as the source of the catalytic substance.

If the organometallic compound is liquid, it is evaporated by heating it to at least its boiling point, and the obtained vapors are heated to at least their decomposition temperature by mixing them with a carrier gas pre-heated to a temperature of 400-1,400° C. or by heating them with heaters.

The liquid organometallic compound is preferably iron pentacarbonyl, but the invention is not thus limited and the use of other suitable substances is also allowed.

If the organometallic compound is solid, it is first melted by heating it to at least its melting point, and then evaporated by heating it to at least its boiling point. The obtained vapors are heated to at least their decomposition temperature. The heating to decomposition temperature can be achieved by mixing the vapors with a carrier gas pre-heated to a temperature of 400-1,400° C. or by heating them with heaters.

The solid organometallic compound is preferably selected from the group comprising ferrocene, nickelocene, cobaltocene, but the invention is not thus limited and the use of other suitable substances is also allowed.

The vapors of the solid organometallic compound can also be obtained by dispersing a fine powder of such compound with a carrier gas and then heating the obtained gas-powder mixture to the boiling point of this compound. The obtained vapors are then heated to the decomposition temperature of the organometallic compound. If the compound can decompose directly from its solid state, the decomposition of the organometallic compound proceeds from solid powder phase without the evaporation step. The heating to the decomposition temperature can be achieved both by using conventional heaters and by mixing with a carrier gas pre-heated to a temperature of 400-1,400° C.

The vapors containing the catalytic substance can be pre-mixed with gaseous hydrocarbons and/or sulfur-containing compounds, such as thiophene, or water vapor, to optimize the process of the organometallic compound decomposition, prior to mixing with the carrier gas.

To reduce the load on the heaters, the gaseous hydrocarbons can be pre-heated to a temperature of at least 400° C.

The catalyst substance in this case is selected from: Group 5B transition metal, Group 6B transition metal, Group 8 transition metal, preferably iron, or a combination of two, three, or more elements including transition metals.

If the vapors containing the catalytic substance are prepared using thermal decomposition of an organometallic compound, the higher the temperature in the evaporation chamber, the more rapid is the decomposition of the source of the catalytic substance, and the faster the supersaturation of the gas phase with the vapors containing the catalytic substance occurs. When the vapors containing the catalytic substance are formed using an electric arc discharge between electrodes, vapor content is initially at its maximum. Because of a high mass concentration of vapors containing the catalytic substance, it is possible to maintain a high level of supersaturation in the gas phase at a temperature close to the temperature in the reaction chamber (~1,000° C.). The requirements to temperature are essential, since the higher the temperature, the greater is the number of the forming metallic particle condensation centers, and the greater is the number of particles and the smaller their size [Theoretical models for kinetics of aerosol formation. Monograph-Sarov: Russian Federal Nuclear Center—All-Russian Scientific Research Institute of Experimental Physics, 2000-209].

Obtaining the Working Mixture in the Mixing Node

The working mixture of this method is obtained in the mixing node located in the working mixture preparation node that is spatially separated from the reaction chamber wherein the synthesis of single wall carbon nanotubes occurs.

The working mixture is obtained at 650-1,400° C. by delivering the vapors containing the catalytic substance to the mixing node from the evaporation chamber in a carrier gas flow, and introducing gaseous hydrocarbons thereto.

To deliver the vapors containing the catalytic substance to the mixing node, the carrier gas, pre-heated to a temperature of 400-1,400° C., is passed through the evaporation chamber, and thereafter the mixture of the carrier gas with the vapors containing the catalytic substance passes to the mixing node, where its mixing with gaseous hydrocarbons takes place.

According to this method, the ready working mixture may comprise the carrier gas, the gaseous hydrocarbons, and nanoparticles containing the catalytic substance, their average size being 1-10 nm, with single wall carbon nanotubes (single wall carbon nanotube seeds) already beginning to form thereupon at this step.

The working mixture is formed in such a way that it may comprise nanoparticles with an average size of more than 10 nm, however, in the conditions of this method, such particles are further covered with a shell consisting of several graphene layers and subsequently do not participate in the synthesis of single wall carbon nanotubes.

The carrier gas is preferably selected from the following group: an inert gas, hydrogen, nitrogen, ammonia, hydrocarbons, alcohol vapors, or a combination of two, three, or more thereof.

According to this method, the hydrocarbons are preferably selected from: natural gas, methane, ethane, propane, butane, pentane, hexane, ethylene, propylene, aliphatic hydrocarbons, or mono- or bicyclic aromatic hydrocarbons with fused or isolated rings, and olefins $C_xH_{2x}$, where x is 2, or 3, or 4, or other hydrocarbon gases, wherein the number of carbons is in the range of 7 to 10; or a hydrocarbon with a high-saturated vapor pressure, or ethyl alcohol, or vapors of anthracene or anthracene oil, or a combination of two, three, or more thereof.

Because of a high mass concentration of the vapors of the catalytic substance in the gas, it is possible to maintain a high level of supersaturation in the composition of the working mixture at a temperature close to the temperature in the reaction chamber, in which the synthesis of single wall carbon nanotubes occurs (~1,000° C.). Furthermore, a high temperature of the working mixture is required to keep the nanoparticles containing the catalytic substance in their molten state, since the growth of carbon nanotubes is possible on molten metal particles only [A. Moisala, A. G. Nasibulin, and E. I. Kauppinen, J. Phys.: Condens. Matter 15, S3011 (2003); Takagi, D., Homma, Y., Hibino, H., Suzuki, S., & Kobayashi, Y. (2006). Single-Walled Carbon Nanotube Growth from Highly Activated Metal Nanoparticles. Nano Letters, 6(12), 2642-2645].

It is essential for industrial scale synthesis of single wall carbon nanotubes that carbon is dissolved in a metal particle. The amount of carbon that can be dissolved in a metal particle increases with rising temperature and decreasing particle size [A. Moisala, A. G. Nasibulin, and E. I. Kauppinen, J. Phys.: Condens. Matter 15, S3011 (2003)]. Therefore, nanoparticles containing the catalytic substance of more than 10 nm cannot act as a growth catalyst for single wall carbon nanotubes at 1,000° C., as they are in their solid state and are not capable of dissolving carbon supplied to their surface. In such particles, the surface carbon attains an equilibrium structure and forms a shell for the metal particle comprising several layers of graphene [Moisala, A., Nasibulin, A. G., Brown, D. P., Jiang, H., Khriachtchev, L., & Kauppinen, E. I. (2006). Chemical Engineering Science, 61(13), 4393-4402]. As a result, a catalytic substance that mostly consists of spherical nanoparticles of up to 10 nm, with the remainder consisting of carbon-covered spherical particles of a larger diameter, can be supplied to the reactor inlet.

This produces a working mixture that comprises a carrier gas, nanoparticles containing the catalytic substance, and hydrocarbons. The working mixture is saturated with spherically shaped nanoparticles containing the catalytic substance with an average size of 1-10 nm that contain dissolved carbon.

Feeding the Working Mixture at a Temperature of 650-1,400° C. to the Reaction Chamber If necessary, the working mixture is additionally heated to a temperature of 650-1,400° C. before feeding to the reaction chamber.

The heating of the working mixture to a temperature comparable to the temperature in the reaction chamber helps eliminate temperature gradient, which in the case of high concentrations of nanoparticles containing the catalytic substance can result in obtaining the synthesized product in the form of a mixture of single wall and multiwall carbon nanotubes with a wide variation in parameters.

The working mixture is supplied to the reaction chamber at a mass rate of at least 10 g per minute, the nanoparticles containing the catalytic substance are supplied to the reaction chamber at a mass rate of at least 1 g per minute.

The residence time of the working mixture in the reaction chamber may be in the range of 0.05 sec to 5 min.

To reduce the influence of reaction chamber walls on the process of single-wall carbon nanotube formation, the number of collisions of molecules with the walls of the chamber should be minimized. This is achieved by increasing the size of the reaction chamber to such values so that the majority of gas particles do not have enough time to hit the wall during their residence in the chamber. This is in turn achieved under the condition that the distance between the nearest walls or the diameter of the chamber (d) substantially exceeds the characteristic length (L) of diffusion of the mixture molecules over the mixture residence time in the reaction chamber (t), i.e., d>>L. The value of L can be estimated using the known expression $L=(D \cdot t)^{0.5}$, where D is the diffusion coefficient. A typical value of the diffusion coefficient for gases at a temperature in the reaction chamber of about 900° C. is $D \approx 10^{-4}$ m$^2$/s. Then the residence time of gas mixture t=10 sec corresponds to diffusion length $L=3 \times 10^{-2}$ m. As the condition d>>L must hold, the distance between the opposite walls of the reaction chamber, or its diameter, has to be at least 0.5 m.

Therefore, for the synthesis of single wall carbon nanotubes at an industrial scale, this method utilizes a reaction chamber with a distance of at least 0.5 m between its opposite walls. This not only allows scaling up the process, but also improves its selectivity.

Discharging the Single Wall Carbon Nanotubes from the Reaction Chamber

The synthesized single wall carbon nanotubes are discharged from the reaction chamber in the stream of gaseous products of hydrocarbon decomposition.

Isolating the Single Wall Carbon Nanotubes

The carbon nanotubes can be removed from the walls of the reaction chamber by mechanical means, e.g., by using a movable ring-shaped scraper located inside the chamber that removes the carbon nanotubes from the walls as it is moved along the chamber axis.

To isolate the single wall carbon nanotubes as the final product from the gas stream, the formed single wall carbon nanotubes are separated by passing the gaseous products of hydrocarbon decomposition from the reaction chamber through a filter. The single wall carbon nanotubes with bundle length of more than 1 μm remaining on the filter are the target product.

After passing through the filter, the waste gases containing the single wall carbon nanotubes with a length of less than 1 μm are divided into two parts. The first part of the waste gases is vented into the atmosphere, and the second part is heated to the required temperature using heaters and recirculated back to the mixing node. Thus, a part of the waste gases may constantly circulate in the mixing node-filter-heater-mixing node circuit.

In the reaction chamber, the bundles of single wall carbon nanotubes continue to grow to sizes of 1 μm and larger. As a result, the yield of the final product, and thus, process productivity, is increased.

The disclosed method can be implemented in an apparatus for producing single wall carbon nanotubes, the apparatus comprising: 1) a working mixture preparation node having an inlet and an outlet, as well as at least an evaporation chamber and a mixing node; 2) a reaction chamber having an inlet for the working mixture and an outlet for the products of hydrocarbon decomposition, wherein the distance between the opposite walls of the reaction chamber or its diameter is at least 0.5 m; 3) a filter to isolate the single wall carbon nanotubes from the waste gases.

The working mixture preparation node may be arranged according to the first embodiment, the node comprising an evaporation chamber comprising two electrodes, with one of them made from a material comprising the catalytic substance capable of melting and evaporating under the action of electrical arc discharge between the electrodes, with the chamber having an inlet for the carrier gas and an outlet for the mixture of the carrier gas and vapors containing the catalytic substance, as well as a node for mixing the mixture of the carrier gas and vapors with gaseous hydrocarbons. The electrode that is made from a material comprising the catalytic substance is capable of melting and may be configured as an open container filled with metal.

The working mixture preparation node may be arranged according to the second embodiment, the node comprising an evaporation chamber comprising two electrodes, with each of the electrodes configured as an open container filled with metal comprising the catalytic substance capable of melting and evaporating under the action of the electrical arc discharge between the electrodes, with the chamber divided into two parts, with each electrode located in a separate part.

The chamber parts are connected with a discharge channel having an inlet for the plasma-forming gas configured to have the plasma-forming gas enter into a vortex stream, with the channel having an inlet for the carrier gas and an outlet for the mixture of the carrier gas and vapors containing the catalytic substance, and a node for mixing the mixture of the carrier gas with the nanoparticles and hydrocarbons.

The working mixture preparation node may be implemented according to the third embodiment and may comprise an evaporation channel and a decomposition channel for a liquid organometallic compound with sequentially positioned heaters, an inlet for hot carrier gas with vapors containing the catalytic substance, and a mixing node for mixing them with gaseous hydrocarbons.

The same working mixture preparation node, but for a solid organometallic compound, is additionally equipped with a melting chamber to melt the organometallic compound connected with the evaporation channel via a dispenser.

The working mixture preparation node may be implemented according to the fourth embodiment and may comprise a container for powdered organometallic compound connected with a powder dispersion channel via a dispenser, which is in turn connected to an evaporation channel to evaporate the powdered organometallic compound connected with an organometallic compound decomposition channel. The organometallic compound decomposition channel has an inlet for the carrier gas and an outlet for the carrier gas with vapors containing the catalytic substance. The outlet is connected with a mixing node, which further has an inlet for gaseous hydrocarbons and an outlet for the working mixture.

The reaction chamber may further have a mechanism to clean the walls from the single wall carbon nanotubes deposited or formed on the walls of the reaction chamber.

FIG. 1 shows a diagram of an apparatus for producing single wall carbon nanotubes and the method implemented therein, where: 1 is the reaction chamber, 2 is the working mixture, 3 is the working mixture preparation node, 4 are the products of gaseous hydrocarbon decomposition, 5 is the filter, 6 are the single wall carbon nanotubes (target product), 40 are the waste gases containing the products of gaseous hydrocarbon decomposition and single wall carbon nanotubes with bundle length of less than 1 μm.

The process is performed as follows:

The working mixture preparation node 3, or more specifically, the mixing node 18 located therein, mixes the pre-formed gas streams so that the obtained mixture comprises the carrier gas, nanoparticles containing the catalytic substance, and hydrocarbons. The temperature of the working mixture is maintained in the range 650-1,400° C. If the working mixture in the working mixture preparation node 3 has a lower temperature, it is additionally heated. The nanoparticles containing the catalytic substance with average particle size 1-10 nm are part of the working mixture and are formed as a result of condensation of vapors or decomposition products of chemical particles comprising the catalytic substance. At this step, single wall carbon nanotubes (single wall carbon nanotube seeds) begin to form on the nanoparticles with average particle size 1-10 nm.

The prepared working mixture 2, having the abovementioned temperature, is fed to the reaction chamber 1, having a distance of at least 0.5 m between its opposite walls (diameter). The working mixture is supplied at such a rate so that the residence time in the reaction chamber remains in the range of 0.05 s to 5 min. The preferred duration of working mixture interaction in the reaction chamber is about 10 seconds. The mass rate of supplying the working mixture heated to 650-1,400° C. to the reaction chamber is at least 10 g per minute, while the mass rate of supplying the nanoparticles comprising the catalytic substance to the reaction chamber is at least 1 g per minute.

The pre-heating of the working mixture to temperatures 650-1,400° C. is required so that at the step of working mixture formation the nanoparticles containing the catalytic substance with average particle size 1-10 nm would be saturated with dissolved carbon, and the single wall carbon nanotube seeds would be formed (single wall carbon nanotubes would begin to grow).

If necessary, the prepared working mixture is additionally heated to a temperature of 650-1,400° C. before feeding to the reaction chamber.

In the reaction chamber 1 at a temperature of 650-1,400° C. the gaseous hydrocarbons of the working mixture 2 decompose to form additional free carbon that immediately transforms into single wall carbon nanotubes growing at the surface of the catalyst nanoparticles with average particle size 1-10 nm. Since the nanoparticles containing the catalytic substance and supplied with the working mixture to the reaction chamber already contain dissolved carbon, and the working mixture conditions are maximally close to conditions for the growth of nanotubes (reaction chamber conditions), the growth of single wall carbon nanotubes in the reaction chamber proceeds at a high rate. The formed single wall carbon nanotubes together with the gas consisting of the products of hydrocarbon decomposition and the carrier gas 4 are discharged from the reaction chamber.

The hydrocarbons used in the method preferably belong to the group that includes methane, ethane, propane, butane, pentane, hexane, ethylene, propylene, aliphatic hydrocarbons, or mono- or bicyclic aromatic hydrocarbons with fused or isolated rings and olefins $C_xH_{2x}$ (where x is 2, or 3, or 4), or vapors of anthracene or anthracene oil, or another hydrocarbon gas, wherein the number of carbons is in the range of 7 to 10; or a hydrocarbon with a high-saturated vapor pressure, or ethyl alcohol, or a combination thereof. Hydrocarbons are the starting material in the production of carbon nanotubes.

To isolate the single wall carbon nanotubes as the final product 6, the solid phase is separated from the gaseous products of hydrocarbon decomposition by passing the gas stream through a filter 5, or cyclone, or another equivalent device. Prior to separating the solid phase from the gas phase, the products of hydrocarbon decomposition may be pre-cooled.

The filter 5 is configured to have the bundles of single wall carbon nanotubes with a length of more than 1 μm settle on it, while those with a length of less than 1 μm pass through the filter with the waste gas stream 40. The single wall carbon nanotubes with bundle length of more than 1 μm remaining on the filter are the target product 6.

After passing through the filter, the waste gases 40 containing the single wall carbon nanotubes with a length of less than 1 μm are divided into two parts. The first part of the waste gases is vented into the atmosphere, and the second part is heated to the required temperature using heaters and recirculated back to the mixing node. Thus, a part of the waste gases may constantly circulate in the mixing node-filter-heater-mixing node circuit, improving the overall process productivity.

To initiate the synthesis of the single wall carbon nanotubes, free nanoparticles containing the catalytic substance have to be supplied to the reaction chamber 1. These nanoparticles may be both a compound of the catalyst substance with other reagents and a pure substance, such as iron. The nanoparticles may enter the reaction chamber 1 with the working mixture 2. The nanoparticles containing the catalytic substance have an average particle size of 1-10 nm. Such nanoparticles are obtained via condensation of vapors or decomposition products of chemical compounds comprising the catalytic substance. The vapors or decomposition products comprising the catalytic substance are formed at the step of preparing the working mixture 2 in the working mixture preparation node 3, which can have various designs, as demonstrated below.

Figure 2:
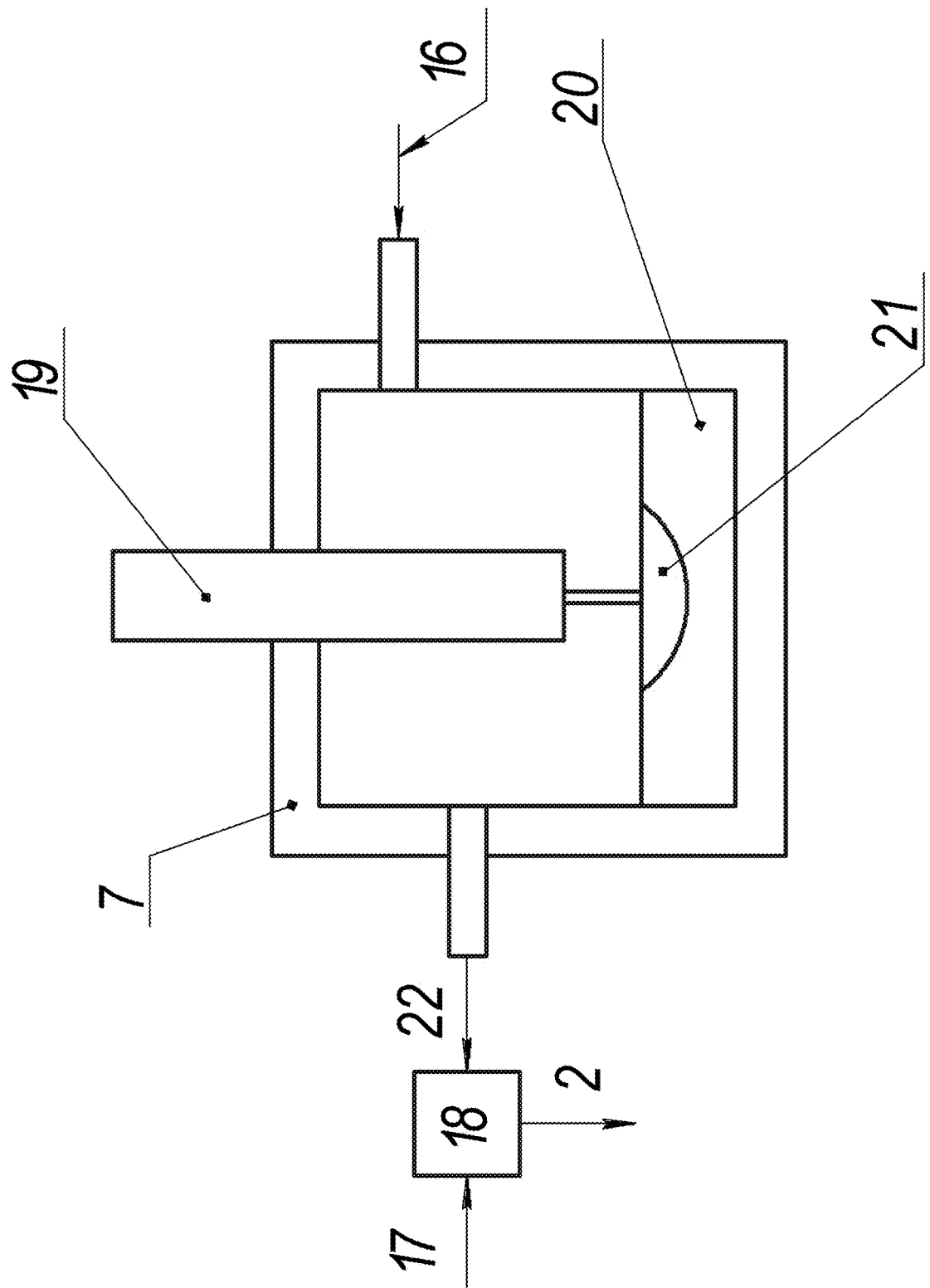
FIG. 2 shows the first embodiment of a working mixture preparation node using an electric arc discharge.

FIG. 2 shows a working mixture preparation node according to the first embodiment, wherein: 2 is the working mixture, 7 is the evaporation chamber, 16 is the carrier gas, 17 are hydrocarbons, 18 is the mixing node, 19 is the solid electrode, 20 is the partially molten electrode, 21 is the molten part of the electrode, 22 is the carrier gas with vapors containing the catalytic substance. In this working mixture preparation node, the nanoparticles containing the catalytic substance are obtained using an electric arc discharge between two electrodes 19 and 20. Electrode 20 is configured as a container filled with material capable of melting under the action of the electrical arc and comprising the catalytic substance.

Both electrodes are located in the evaporation chamber 7 opposite each other. When an electric discharge arises between the electrodes, electrode 20 begins to melt, forming vapors containing the catalytic substance. These vapors enter the evaporation chamber. Concurrently the carrier gas 16 is supplied to the evaporation chamber, and vapors of the catalytic substance in the carrier gas atmosphere may begin to condense, forming nanoparticles containing the catalytic substance.

The carrier gas with the vapors containing the catalytic substance 22 leaves the evaporation chamber and enters the mixing node 18, where the formation of the nanoparticles containing the catalytic substance is finalized. Gaseous hydrocarbons 17 are also supplied to the mixing node 18; if required, they may be pre-heated, preferably to at least 400° C. The mixture obtained in the mixing node 18 is the working mixture 2, which is supplied to the reaction chamber.

Figure 3:
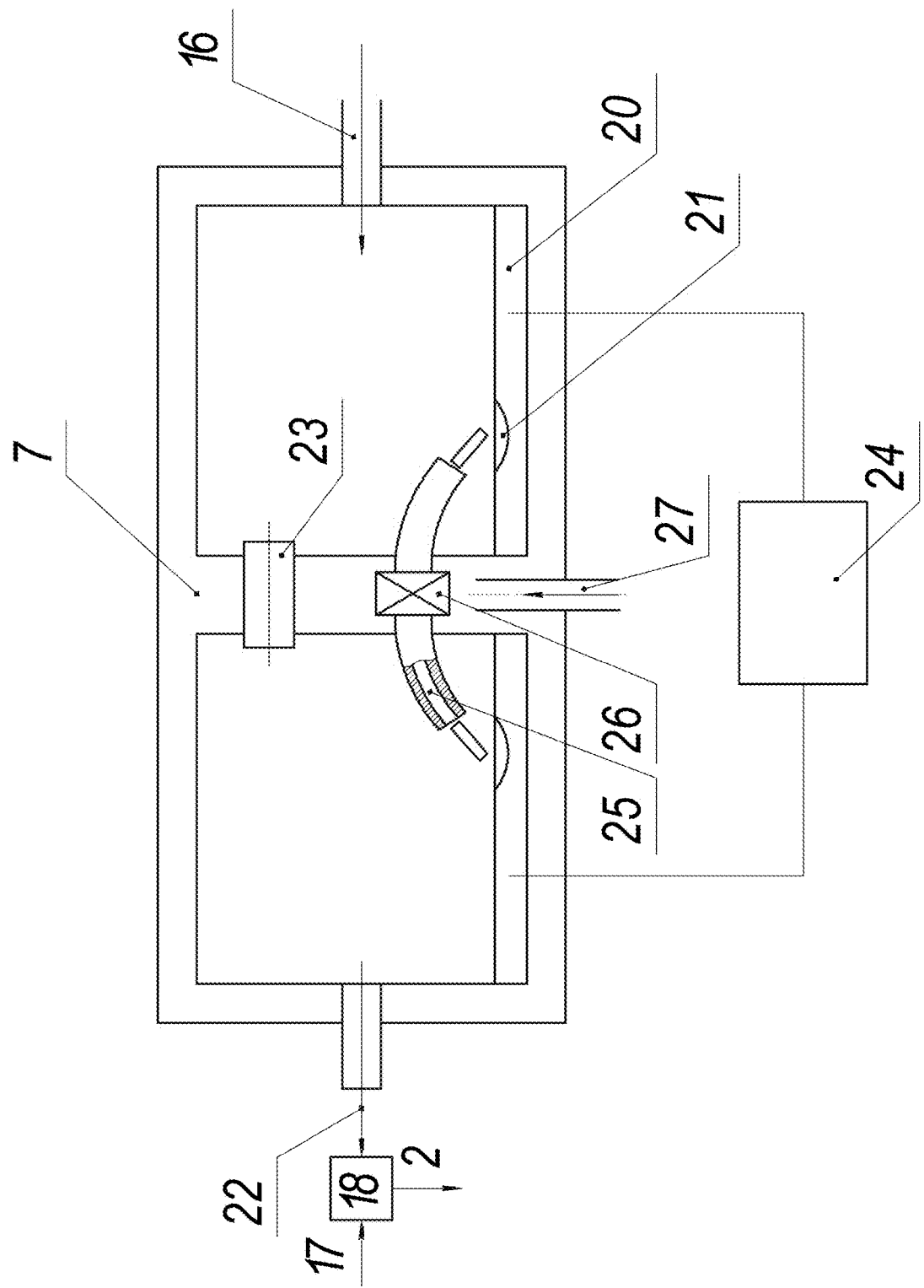
FIG. 3 shows the second embodiment of a working mixture preparation node using an electric arc discharge.

FIG. 3 shows a working mixture preparation node according to the second embodiment, wherein: 2 is the working mixture, 7 is the evaporation chamber, 16 is the carrier gas, 17 are the gaseous hydrocarbons, 18 is the mixing node, 20 is the partially molten electrode, 21 is the molten part of the electrode, 22 is the carrier gas with vapors containing the catalytic substance, 23 is the gas channel between the parts of the evaporation chamber, 24 is the power supply, 25 is the discharge channel, 26 is the vortex chamber, 27 is the plasma-forming gas.

In this working mixture preparation node, the vapors containing the catalytic substance are obtained using an electric arc discharge between the two partially molten electrodes 20. The evaporation chamber 7 comprises two electrodes, each electrode configured as a container filled with material comprising the catalytic substance, which may further be the catalytic substance itself, such as iron.

This apparatus comprises two electrodes 20 located in separate parts of the evaporation chamber 7. Both electrodes are configured as open containers filled with material comprising the catalytic substance, or the catalyst itself. Both electrodes are capable of melting and evaporating under the action of the electric arc discharge. The two parts of the evaporation chamber 7 are connected with a gas channel 23 and a discharge channel 25, which is supplied with the plasma-forming gas 27 to maintain the electric arc in the channel. The discharge channel has an inlet formed in the center of the channel, and the plasma-forming gas 27 is supplied through the inlet to create a vortex gas motion. This ensures a stable electric arc discharge in the discharge channel.

The plasma-forming gas is supplied to the discharge channel as a vortex stream, using conventional methods known in the art. For example, the plasma-forming gas may be introduced into the discharge channel tangentially to form a vortex stream that stabilizes the arc discharge. The plasma-forming gas may comprise hydrocarbons or an inert gas and one or more gases from the group of nitrogen, hydrogen, and ammonia.

The evaporation chamber has an inlet 16 for the carrier gas and an outlet for the carrier gas with vapors containing the catalytic substance 22.

Both electrodes may be formed entirely from the catalytic substance or may comprise a mixture of the catalyst and other substances. The electrode may comprise more than 20%, more than 30%, more than 40%, more than 50%, more than 60%, more than 70%, more than 80%, more than 90%, more than 95%, etc., and up to 100% of the catalytic substance. The vapors containing the catalytic substance are formed during evaporation of the electrodes under the action of electric discharge. The nanoparticles containing the catalytic substance begin to condense in the evaporation chamber in the atmosphere of the carrier gas. The process of nanoparticles formation is finalized in the mixing node. The electrode may be formed entirely from the catalytic substance or may comprise a mixture of the catalyst and other substances.

The carrier gas 22 with the vapors containing the catalytic substance passes from the evaporation chamber 7 to the mixing node 18, where it is mixed with the gaseous hydrocarbons pre-heated to at least 400° C., and where the formation of the nanoparticles containing the catalytic substance is finalized. Note that the hydrocarbons may have a lower temperature or even not be heated. However, pre-heating the hydrocarbons accelerates the process of preparation of the working mixture. Thus, the prepared working mixture 2 is supplied to the reaction chamber.

Figure 4:
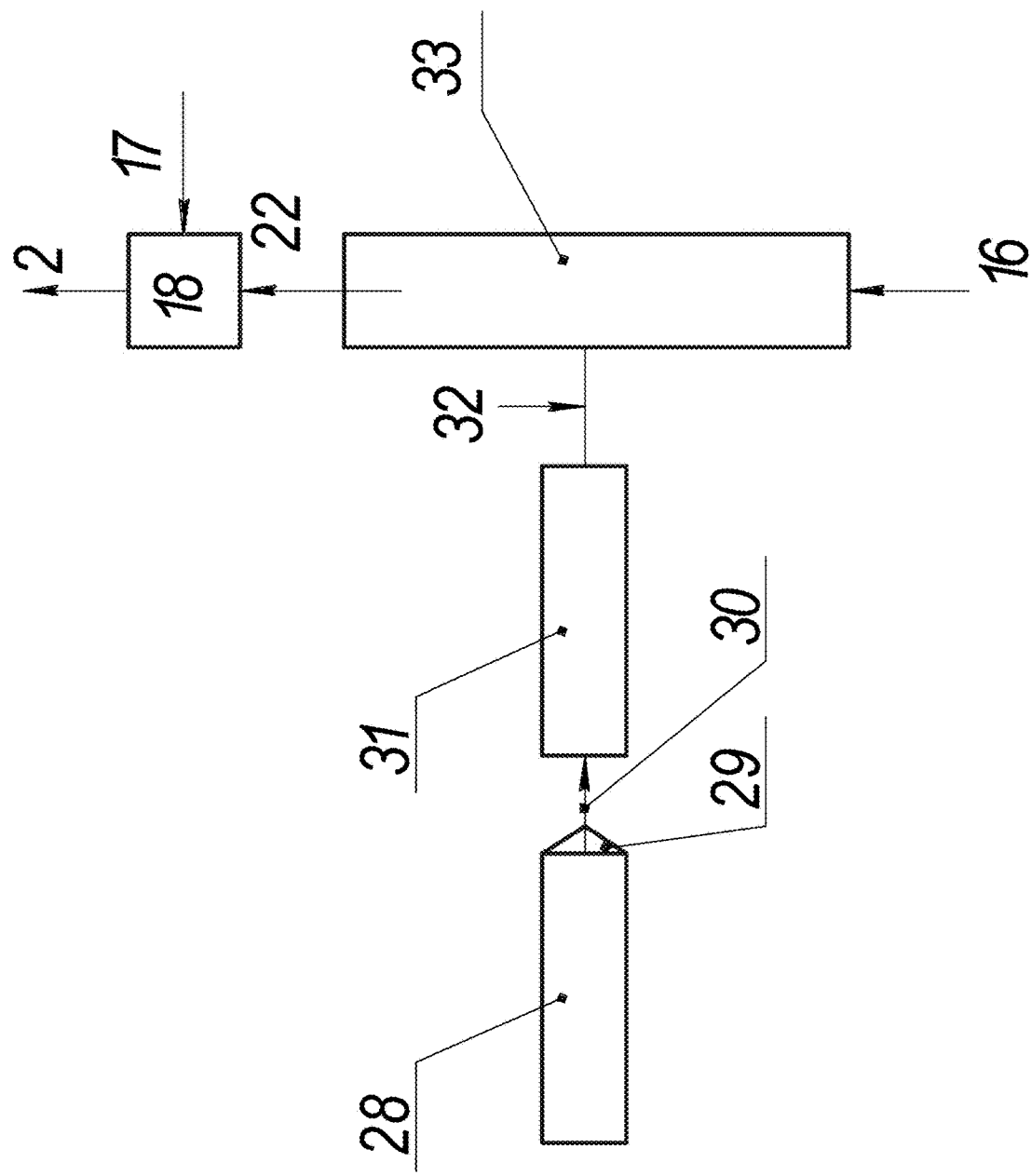
FIG. 4 shows the third embodiment of a working mixture preparation node using an organometallic compound.

FIG. 4 shows a working mixture preparation node according to the third embodiment, wherein: 16 is the carrier gas, 17 are the gaseous hydrocarbons, 18 is the mixing node, 22 is the carrier gas with vapors containing the catalytic substance, 28 is the chamber for melting the organometallic compound, 29 is the dispenser, 30 is the molten organometallic compound, 31 is the organometallic compound evaporation channel, 32 are the vapors of the organometallic compound, 33 is the organometallic compound decomposition channel.

In the working mixture preparation node 3, solid organometallic compounds are used with the nanoparticles containing the catalytic substance. The starting solid organometallic compound, such as ferrocene $(C_5H_5)_2Fe$, is melted in the melting chamber 28, where the heaters provide the required melting temperature. The molten organometallic compound 30 enters the evaporation channel 31 from the melting chamber via the dispenser 29 configured to control the rate of supplying the substance. The melting chamber may be configured as a syringe. In this case, it additionally performs the function of a dispenser. The melting takes place in the syringe, when the substance is heated to the corresponding temperatures with heaters. The dispensing is effected by uniform displacement of the syringe plunger, resulting in squeezing the molten substance out into the evaporation channel 31. In the evaporation channel 31, the molten organometallic compound is heated to its boiling point with heaters.

The vapors of the organometallic compound 32 are formed in the process of boiling. These vapors enter the decomposition channel 33, where they are mixed with hot carrier gas 16. The evaporation and decomposition channel may be formed as a unified whole. In this case, the evaporation and decomposition channel has an inlet for the carrier gas. The temperature in the decomposition channel is maintained at a level of at least the decomposition temperature of the organometallic compound. The temperature in the channels is maintained using heaters.

The temperature of the carrier gas supplied to the decomposition channel 33 is 600-1,400° C. The organometallic compound decomposes in the atmosphere of the carrier gas, and the products of decomposition containing the catalytic substance begin to condense into nanoparticles, e.g., iron-containing nanoparticles are formed during decomposition of ferrocene. Thereafter, the carrier gas 22 containing the vapors and partially the nanoparticles is directed to the mixing node 18, where it is mixed with pre-heated gaseous hydrocarbons. The obtained working mixture 2 enters the reaction chamber, where the processes described above proceed.

This working mixture preparation node may be adapted for liquid organometallic compounds. When the method uses liquid organometallic compounds, the melting chamber is no longer needed, and the liquid organometallic compound is directly supplied to the evaporation and decomposition channel 31. Furthermore, the system of working mixture preparation remains the same.

Figure 5:
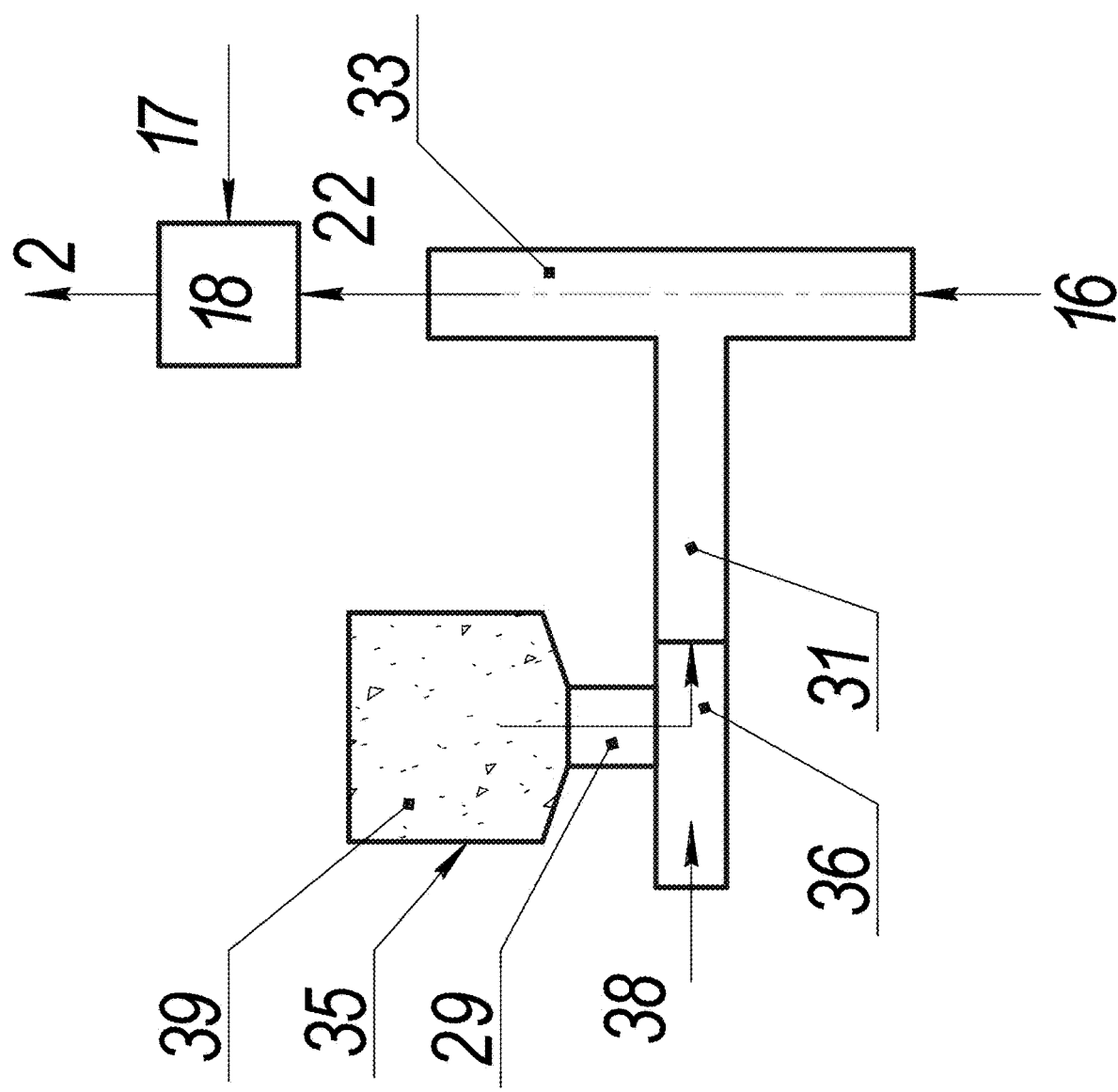
FIG. 5 shows the fourth embodiment of a working mixture preparation node using a solid organometallic compound in the form of fine powder.

FIG. 5 shows a working mixture preparation node according to the fourth embodiment, wherein: 16 is the carrier gas, 17 are the gaseous hydrocarbons, 18 is the mixing node, 22 is the carrier gas with vapors containing the catalytic substance, 29 is the dispenser, 31 is the organometallic compound evaporation channel, 33 is the organometallic compound decomposition channel, 35 is the container for the powder of the organometallic compound, 36 is the organometallic compound dispersion channel, 38 is the gas for dispersing, 39 is the organometallic compound powder.

This working mixture preparation node uses solid organometallic compounds in the form of fine powder. The fine powder of the organometallic compound 39 is loaded into the container for the powder of the organometallic compound 35. The powder from the container is supplied via the dispenser 29 to the dispersion channel 36, through which the dispersing gas 38 is blown to disperse the powder particles. The dispersing gas is preferably an inert gas or the same gas as the carrier gas. The powder enters the evaporation channel 31 together with the gas, where it is heated and evaporated. The powder vapors subsequently enter the decomposition channel 33, through which the carrier gas 16 is also blown.

In the decomposition channel, the organometallic compound decomposes due to high temperatures of the channel walls and the heated carrier gas 16. In the decomposition channel, the vapors containing the catalytic substance begin to condense in the presence of the carrier gas, and the nanoparticles containing the catalytic substance begin to form. The carrier gas with the vapors/nanoparticles 22 enters the mixing node 18, to which the gaseous hydrocarbons 17 are also supplied. The obtained working mixture 2 is then directed to the reaction chamber.

Liquid organometallic compounds may be used in the same fashion, but in this case, liquid spraying is used instead of gas dispersion of fine powder.

The embodiments of the working mixture preparation node described above allow you to obtain a working mixture with pre-formed nanoparticles containing the catalytic substance and having an average size of 1-10 nm. Since the nanoparticles containing the catalytic substance are prepared beforehand, they enter the reaction chamber as part of the working mixture, which provides the abovementioned benefits. It is important to keep in mind that the working mixture preparation node may have other configurations, not described herein.

It should be noted that the preliminary preparation of the nanoparticles containing the catalytic substance and subsequent preparation of the working mixture take place in the working mixture preparation node, which is spatially separated from the reaction chamber wherein the synthesis of single wall carbon nanotubes occurs. The spatial separation of the process of preparation of the nanoparticles containing the catalytic substance and of synthesis of single wall carbon nanotubes allows you to individually control and optimize each process.

Figure 6:
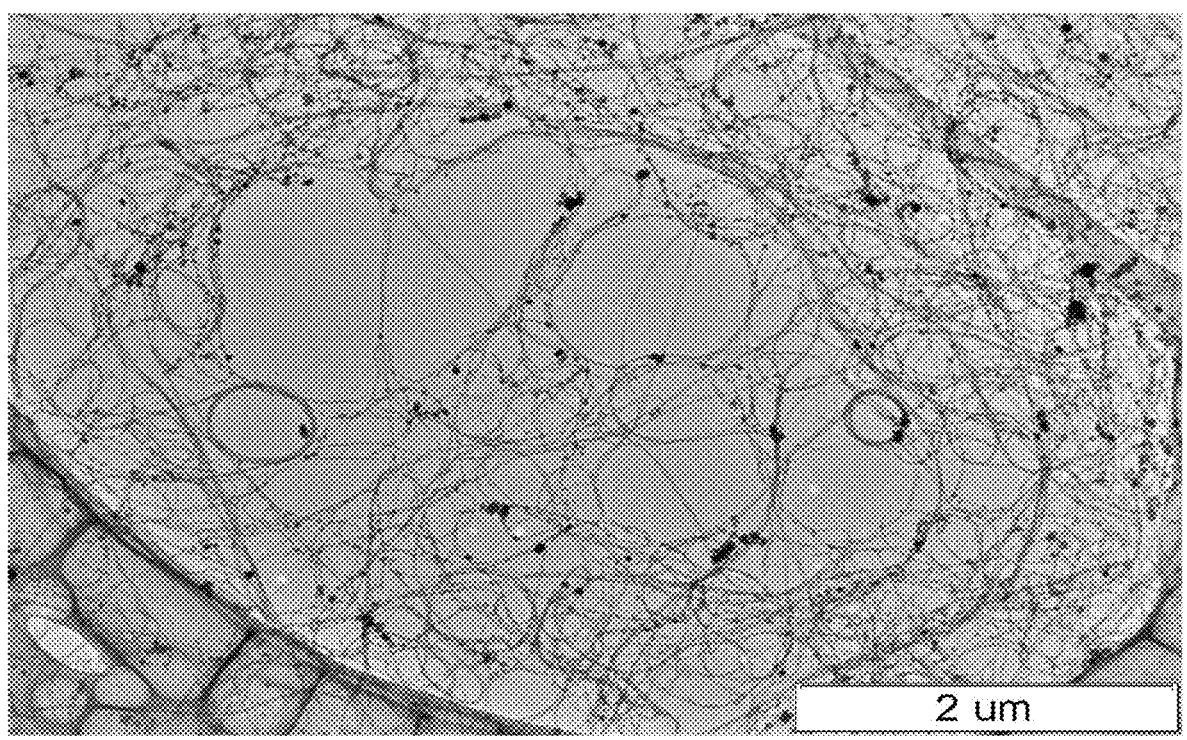
FIG. 6 shows typical images of the synthesized single wall carbon nanotubes obtained using Transmission Electron Microscopy (TEM).
Figure 7:
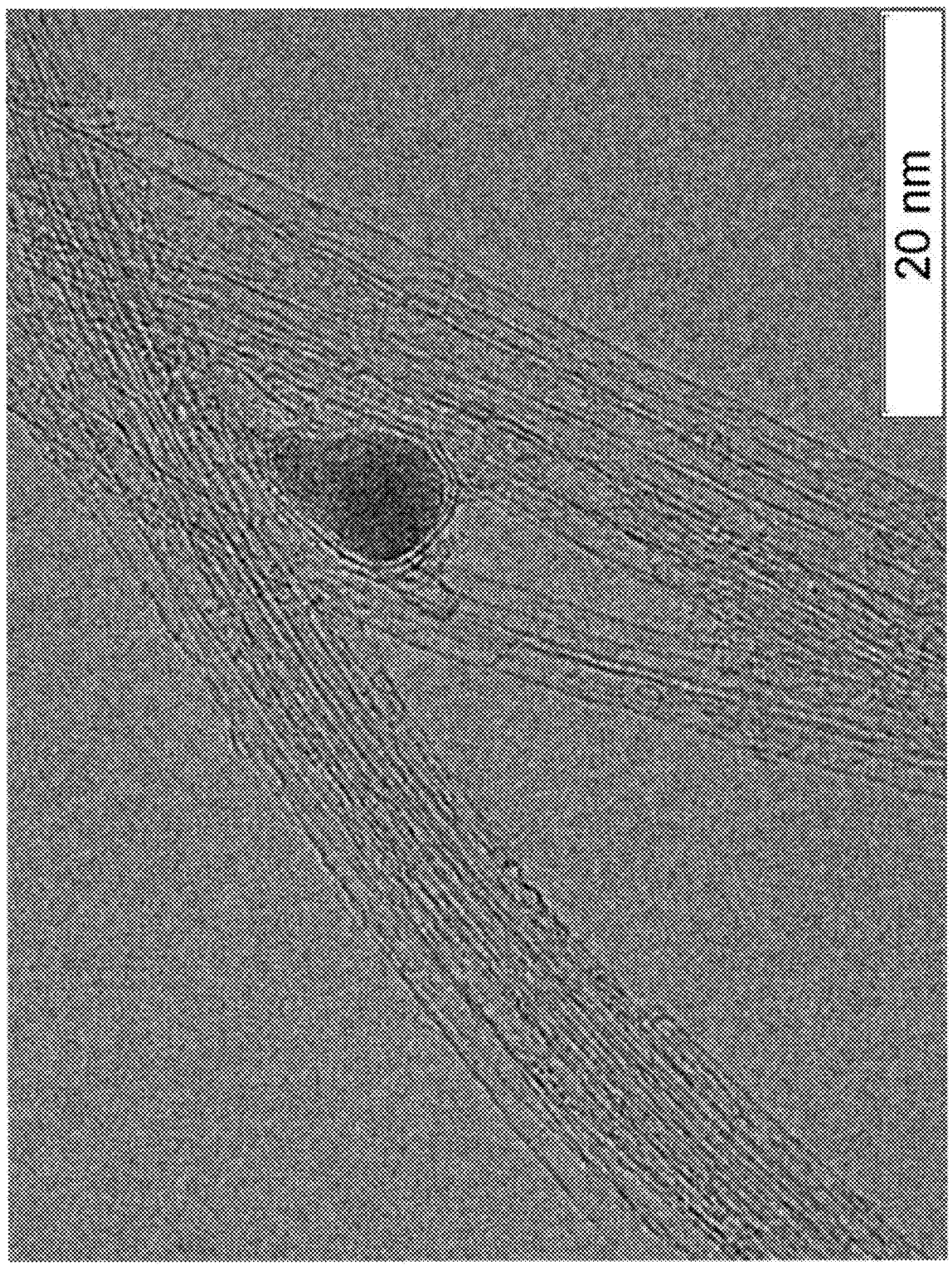
FIG. 7 shows typical images of the synthesized single wall carbon nanotubes obtained using Transmission Electron Microscopy (TEM).

FIGS. 6 and 7 show the typical images obtained using Transmission Electron Microscopy. The analysis was performed in compliance with ISO/TS 10797:2012 (E) Nanotechnologies: Characterization of Single Wall Carbon Nanotubes Using Transmission Electron Microscopy and ISO/TS 10798:2011 (E) Nanotechnologies: Characterization of Single Wall Carbon Nanotubes Using Scanning Electron Microscopy and Energy Dispersive X-Ray Spectrometry Analysis, with the conclusion that the obtained material contains single wall carbon nanotubes with a diameter of 1.6±0.4 nm (1σ confidence level).

The material synthesized according to the disclosed method is comprised predominantly of carbon (at least 85 wt. %) and residual particles containing the catalytic substance (less than 15 wt. %). The carbon is present in the form of single wall carbon nanotubes (at least 80 wt. %) and graphite-like shells covering nanoparticles with sizes larger than 10 nm (not more than 5 wt. %).

Figure 8:
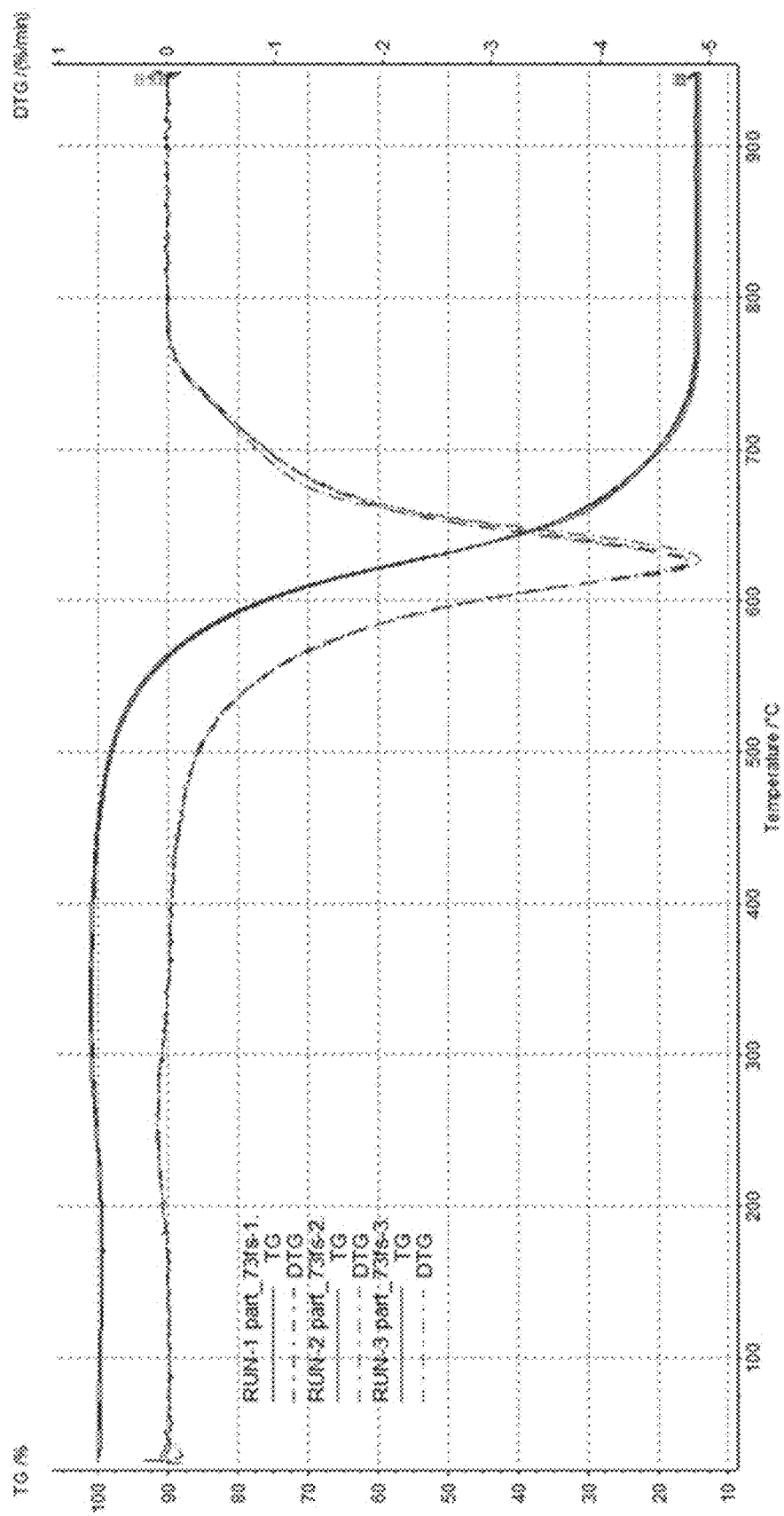
FIG. 8 shows the results of thermogravimetric analysis (TGA) of the synthesized single wall carbon nanotubes.

The results of thermogravimetric analysis (TGA, FIG. 8), performed in compliance with the requirements of ISO/TS 11308:2011 (E) Nanotechnologies: Characterization of Single Wall Carbon Nanotubes, confirm the conclusion that carbon content is at least 85 wt. %, and iron impurities account for not more than 15 wt. %. The specific surface area of the material, determined in compliance with ISO/TS 9277:2010 (E) Determination of the Specific Surface Area of Solids by Gas Absorption: BET Method, is at least 500 m²/g. Table 1 lists the main structural properties of single wall carbon nanotubes synthesized using the invention.

TABLE 1

Summary of the Main Structural Properties of the Synthesized Single Wall Carbon Nanotubes

| | SWCNT | Method |
|---|---|---|
| SWCNT content, wt. %, | >80 | TEM, EDX, TGA |
| Carbon content, wt. % | >85 | EDX, TGA |
| Abundance of other carbon allotropes, wt. % | <5 | TEM, EDX, TGA |
| Metallic impurities, wt. % | <15 | EDX, TGA, ICP-AES |
| SWCNT diameter, nm | 1.6 ± 0.4 | TEM, NIR-Vis |
| SWCNT length, μm | >5 | AFM |
| G/D Raman ratio at 532 nm | >90 | Raman |
| Specific surface area, m²/g | >500 | BET $N_2$ adsorption |

Figure 9:
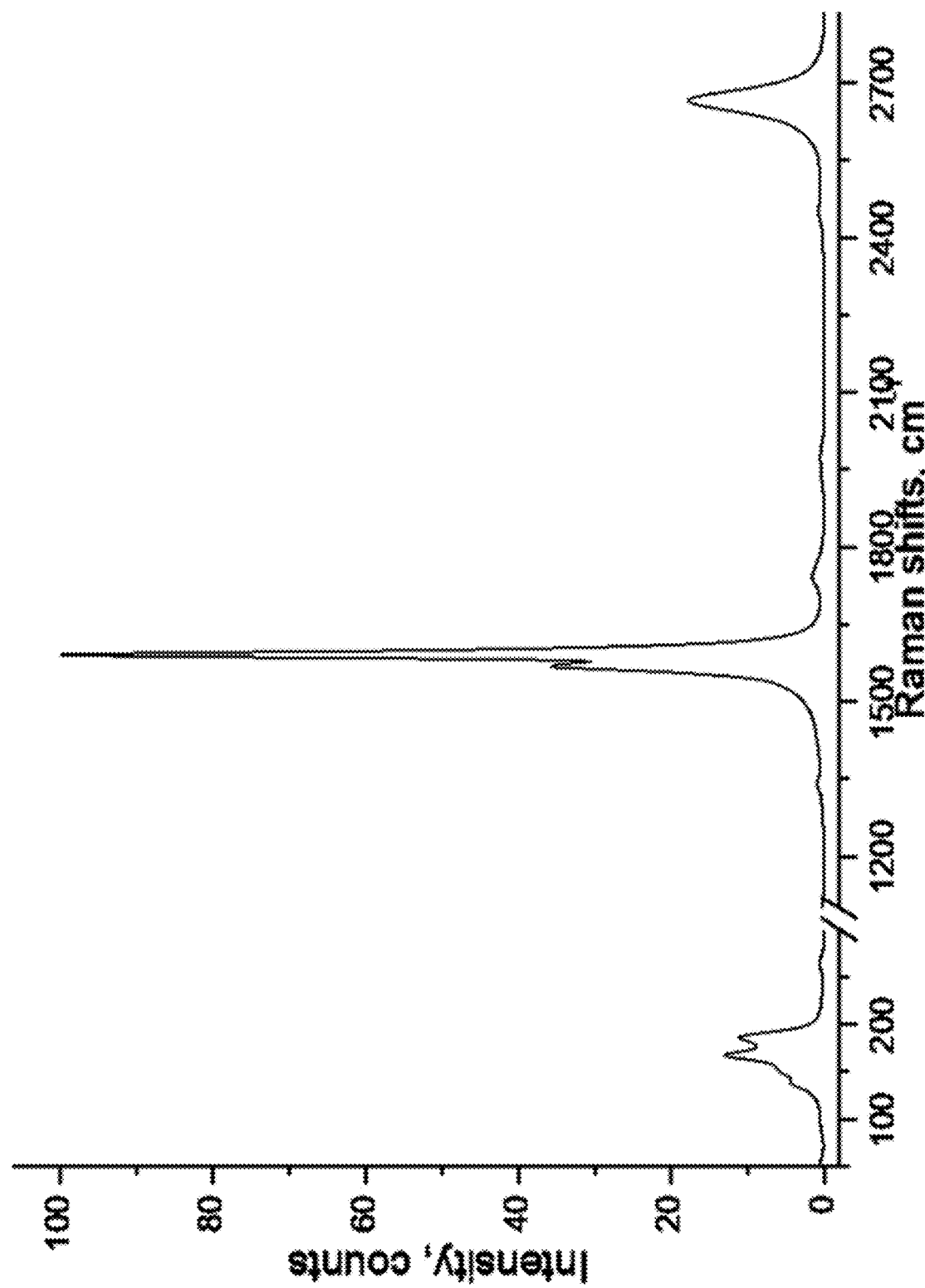
FIG. 9 shows Raman spectrum taken with excitation wavelength 532 nm. (Raman spectra recorded using 532 nm laser excitation.)

FIG. 9 shows Raman spectra recorded using laser excitation with a wavelength of 532 nm. The average G/D ratio determined using 532 nm is 120±10.

The unique design of the reaction chamber, having a distance of at least 0.5 m between its opposite walls, allows a continuous supply of the prepared working mixture to the reaction chamber. A preliminary preparation and pre-heating of the working mixture ensure conditions in which the working mixture is saturated with the nanoparticles containing the catalytic substance with average particle size 1-10 nm, with the nanoparticles containing dissolved carbon and the growth of the single wall carbon nanotubes beginning thereupon. In these conditions, the nanoparticles containing the catalytic substance are in free flow both in the working mixture and in the reaction chamber, which excludes the formation of any other nanotubes except single wall nanotubes. The method of the invention takes into account the key factors for a cost-efficient chemical vapor deposition (CVD) synthesis of high quality single wall carbon nanotubes. The synthesis is further optimized to maximize carbon conversion from hydrocarbon into single wall carbon nanotubes while minimizing energy losses.

Example 1

Single wall carbon nanotubes are obtained according to the diagram presented in FIG. 1.

The diagram of the apparatus for preparing the working mixture 3 is shown in FIG. 2. The nanoparticles containing the catalytic substance are obtained in the evaporation chamber 7. The evaporation chamber 7 has two electrodes, one of which is formed of solid graphite 8, and the other is configured as an open container filled with material comprising the catalytic substance 9. The material filling the container is carbon steel St3. The material of the container is graphite.

When a voltage is applied to the electrodes, an arc discharge appears, with the current maintained at constant 50 A. The steel in the container melts and evaporates, forming iron vapors. Concurrently nitrogen 16 is supplied through the chamber inlet at a rate of 10 m³/h. In the atmosphere of the carrier gas, iron vapors begin to condensate into nanoparticles with an average size of not more than 10 nm. The process of nanoparticles formation is finalized in the mixing node. Then the carrier gas with iron vapors/nanoparticles 21 is supplied to the mixing node 18, to which methane 17, pre-heated to a temperature of 500° C. with heaters, is also supplied at a rate of 2.6 m³/h. Thereafter, the mixture is mixed with the carrier gas 16 heated to a temperature of 1,150° C., which is also supplied to the mixing node 18 at a rate of 30 m³/h. As a result, the working mixture 2 is obtained in the mixing node 18, the mixture comprising the carrier gas, nanoparticles containing the catalytic substance, and hydrocarbons.

The working mixture 2, having a temperature of 1,050° C., is fed to the reaction chamber 1 with a diameter of 0.5 m at a rate of 25 m/sec. The temperature in the reaction chamber is maintained at 920° C. The residence time of the working mixture in the reaction chamber is about 15 s. The catalytic decomposition of methane results in carbon nanotubes forming on the catalyst nanoparticles and the release of hydrogen. The products of methane decomposition are discharged from the chamber through the reaction chamber outlet and, after cooling, are passed through the filter, separating the single wall carbon nanotubes with bundle size of more than 1 μm (target product).

After passing through the filter, the waste gases containing the single wall carbon nanotubes with a length of less than 1 μm are divided into two parts. The first part of the waste gases is removed from the system at a rate of 44 m³/h. The second part of the waste gases containing bundles of single wall carbon nanotubes with a length of less than 1 μm, after passing through the filter, is heated to the required temperature and recirculated back to the mixing node. Thus, a part of the waste gases constantly circulates in the mixing node-filter-heater-mixing node circuit.

Process productivity was 2 kg per hour, methane conversion into single wall carbon nanotubes was 90%.

FIGS. 6 and 7 show typical images of the synthesized single wall carbon nanotubes obtained using Transmission Electron Microscopy (TEM).

FIG. 9 shows Raman spectra recorded using laser excitation with a wavelength of 532 nm. The average G/D ratio determined using 532 nm is 120±10.

The content of the synthesized single wall carbon nanotubes in the synthesized material is 80 wt. %. The remaining ~20 wt. % are catalyst particles (not more than 15 wt. %) covered with carbon shells (not more than 5 wt. %). Thus, the target product quality indices for the majority of large-scale applications have been attained.

Example 2

Single wall carbon nanotubes are obtained according to the diagram presented in FIG. 1.

The diagram of the apparatus for preparing the working mixture 2 is shown in FIG. 3.

The vapors containing the catalytic substance are prepared in the evaporation chamber. The evaporation chamber 7 has two electrodes 20, configured as containers filled with material comprising the catalytic substance. The container filling material is carbon steel St3.

When a voltage from the power supply 24 is applied to the electrodes, an arc discharge appears in the discharge channel 25, through which the plasma-forming gas 26 (nitrogen) is passed as a vortex, the latter created using the vortex chamber, with the current maintained at 90 A. The steel in the electrode containers 21 melts and evaporates, forming iron vapors. Concurrently the carrier gas 16 is introduced into the chamber. The carrier gas is a mixture of hydrogen and nitrogen with molar ratio 3/40. Iron vapors begin to condensate into nanoparticles. Then the carrier gas with iron vapors/nanoparticles 21 is supplied to the mixing node 18, to which methane 17, pre-heated to a temperature of 400° C. with heaters, is also supplied at a rate of 3 m$^3$/h. Thereafter, the mixture is mixed with the carrier gas 16 heated to a temperature of 1,150° C., which is also supplied to the mixing node 18 at a rate of 10 m$^3$/h. As a result, the working mixture 2 is obtained in the mixing node 18, the mixture comprising the carrier gas, nanoparticles containing the catalytic substance, and hydrocarbons.

The working mixture 2, having a temperature of 1,100° C., is fed to the reaction chamber 1 with a diameter of 1 m between its opposite walls. The temperature in the reaction chamber is maintained at 945° C. A catalytic decomposition of methane results in the growth of carbon nanotubes on the iron nanoparticles. The reaction products are passed through the filter 5, in which the single wall carbon nanotubes with bundle size of more than 1 μm (target product) are separated.

After passing through the filter, the waste gases containing the single wall carbon nanotubes with a length of less than 1 μm are divided into two parts. The first part of the waste gases is removed from the system. The second part of the waste gases containing bundles of single wall carbon nanotubes with a length of less than 1 μm, after passing through the filter, is heated to the required temperature and recirculated back to the mixing node. Thus, a part of the waste gases constantly circulates in the mixing node-filter-heater-mixing node circuit.

Process productivity was 2.5 kg per hour, methane conversion into single wall carbon nanotubes was 94%.

The synthesized single wall carbon nanotubes contain iron nanoparticles in carbon shells having two or more carbon monolayers.

The diameter of the synthesized single wall carbon nanotubes is 1.6±0.4 nm, the average G/D ratio determined using 532 nm is 110±10, the BET surface area is 490±30 m$^2$/g.

Carbon content in the obtained material is 86±1 wt. %, the content of single wall carbon nanotubes is 82±1 wt. %, the remaining ~18 wt. % are catalyst particles covered with carbon shells. Thus, the target product quality indices for the majority of large-scale applications have been attained.

Example 3

Single wall carbon nanotubes are fabricated according to the diagram shown in FIG. 1. The working mixture preparation node 3 is identical to the working mixture preparation node shown on the diagram in FIG. 4, except there is no melting chamber and the liquid organometallic compound is supplied directly to the evaporation channel.

Iron pentacarbonyl Fe(CO)$_5$ is supplied to the evaporation channel 31 equipped with heaters, where it evaporates at a temperature of 100° C. The vapors of iron pentacarbonyl are mixed with nitrogen 16 heated to 1,200° C. and supplied at a rate of 8 m$^3$/h, resulting in decomposition of iron pentacarbonyl, with the decomposition products subsequently condensing. In addition to iron vapors, iron nanoparticles with an average size of 5 nm are formed in the atmosphere of the carrier gas. Thereafter, the obtained vapors/nanoparticles enter the mixing node 18 with a stream of nitrogen. Methane, heated to 490° C., delivered at a rate of 3 m$^3$/h, is also supplied to the mixing node. The working mixture 2 obtained in the mixing node 18 is fed to the reaction chamber with a diameter of 0.5 m.

The temperature in the reaction chamber is maintained at 900° C. A catalytic decomposition of methane results in the growth of single wall carbon nanotubes on the iron nanoparticles. The decomposition products are passed through the filter, in which the single wall carbon nanotubes with bundle size of more than 1 μm (target product) are separated.

After passing through the filter, the waste gases containing the single wall carbon nanotubes with a length of less than 1 μm are divided into two parts. The first part of the waste gases is removed from the system at a rate of 40 m$^3$/h. The second part of the waste gases containing bundles of single wall carbon nanotubes with a length of less than 1 μm, after passing through the filter, is heated to the required temperature and recirculated back to the mixing node. Thus, a part of the waste gases constantly circulates in the mixing node-filter-heater-mixing node circuit.

Process productivity was 2.3 kg per hour, methane conversion into single wall carbon nanotubes was 92%.

The diameter of the synthesized single wall carbon nanotubes is 1.6±0.6 nm, the average G/D ratio determined using 532 nm is 109±10, the BET surface area is 493±30 m$^2$/g.

Carbon content in the synthesized material is 87±1 wt. %, the content of single wall carbon nanotubes is 81±1 wt. %, the remaining ~19 wt. % are catalyst particles covered with carbon shells. Thus, the target product quality indices for the majority of large-scale applications have been attained.

Example 4

Single wall carbon nanotubes are obtained according to the diagram shown in FIG. 1. The diagram of the working mixture preparation node 3 is shown in FIG. 4.

Ferrocene is melted in the melting chamber 28 by heating with heaters to a temperature of 300° C. Then, using the dispenser 29, ferrocene is supplied at a rate of 945 g/h in the form of melt to the evaporation channel 31 equipped with heaters, where it evaporates at a temperature of 400° C. Thereafter, the vapors of ferrocene are mixed with hot carrier gas 16, i.e., nitrogen, supplied at a rate of 8 m$^3$/h and having a temperature of 1,200° C., which results in ferrocene decomposition and subsequent condensation of the products of its decomposition. Iron vapors and iron nanoparticles with an average size of 5 nm are formed in the atmosphere of the carrier gas. Thereafter, the obtained mixture of vapors/nanoparticles is supplied with a stream of nitrogen 22 to the mixing node 18, with methane heated to 490° C. also supplied there at a rate of 1.7 m$^3$/h. The working mixture obtained in the mixing node 18 is supplied to the reaction chamber with a diameter of 1 m at a rate of 23 m/sec.

The temperature in the reaction chamber is maintained at 900° C. A catalytic decomposition of methane results in the growth of single wall carbon nanotubes on the iron nanoparticles.

The decomposition products are passed through the filter, in which the single wall carbon nanotubes with bundle size of more than 1 μm (target product) are separated.

After passing through the filter, the waste gases containing the single wall carbon nanotubes with a length of less than 1 μm are divided into two parts. The first part of the waste gases is removed from the system at a rate of 40 m$^3$/h. The second part of the waste gases containing bundles of single wall carbon nanotubes with a length of less than 1 μm, after passing through the filter, is heated to the required temperature and recirculated back to the mixing node. Thus, a part of the waste gases constantly circulates in the mixing node-filter-heater-mixing node circuit.

Process productivity was 2.1 kg per hour, methane conversion into single wall carbon nanotubes was 92%.

The diameter of the synthesized single wall carbon nanotubes is 1.6±0.2 nm, the average G/D ratio determined using 532 nm is 109±10, the BET surface area is 493±30 m$^2$/g.

Carbon content in the synthesized material is 87±2 wt. %, SWCNT content is 81±1 wt. %, the remaining ~19 wt. % are catalyst particles covered with carbon shells. Thus, the target product quality indices for the majority of large-scale applications have been attained.

Example 5

Single wall carbon nanotubes are obtained according to the diagram shown in FIG. 1. The diagram of the apparatus for preparing the working mixture 3 is shown in FIG. 5. Fine ferrocene powder 39 is supplied via the dispenser 29 at a rate of 1,170 g/h into the dispersion channel 36, where it is dispersed with a jet of nitrogen. The obtained powder-gas mixture is fed to the evaporation channel 31, where it is heated to a temperature of 350° C. Ferrocene powder evaporates. The obtained mixture of ferrocene vapors and nitrogen is supplied to the decomposition channel 33, to which the carrier gas 16, i.e., nitrogen, is also supplied at a rate of 30 m$^3$/h at a temperature of 1,200° C. In the carrier gas flow, ferrocene decomposes, and vapors and nanoparticles containing iron atoms are formed. Thereafter, the carrier gas with vapors/nanoparticles 22 is supplied to the mixing node 18, with methane 17 heated to 450° C. also supplied there at a rate of 2.12 m$^3$/h. The working mixture 22 obtained in the mixing node is fed to the reaction chamber with a diameter of 0.5 m, where the temperature is maintained at 960° C. A catalytic decomposition of methane on iron-containing nanoparticles results in the growth of single wall carbon nanotubes. The decomposition products are passed through the filter, in which the single wall carbon nanotubes with bundle size of more than 1 μm (target product) are separated.

After passing through the filter, the waste gases containing the single wall carbon nanotubes with a length of less than 1 μm are divided into two parts. The first part of the waste gases is removed from the system at a rate of 40 m$^3$/h. The second part of the waste gases containing bundles of single wall carbon nanotubes with a length of less than 1 μm, after passing through the filter, is heated to the required temperature and recirculated back to the mixing node. Thus, a part of the waste gases constantly circulates in the mixing node-filter-heater-mixing node circuit.

Process productivity was 2.6 kg per hour, methane conversion into single wall carbon nanotubes was 94%.

The diameter of the synthesized single wall carbon nanotubes is 1.6±0.4 nm, the average G/D ratio determined using 532 nm is 108±10, the BET surface area is 485±25 m$^2$/g.

Carbon content in the obtained material is 85±1 wt. %, the content of single wall carbon nanotubes is 83±1 wt. %, the remaining ~17 wt. % are catalyst particles covered with carbon shells. Thus, the target product quality indices for the majority of large-scale applications have been attained.

INDUSTRIAL APPLICABILITY

The proposed method for the synthesis of carbon nanotubes is intended to obtain single wall carbon nanotubes. However, this method is provided as an example only and cannot be limited to this application alone. Unless stated otherwise, various aspects and components of the methods, systems, and the integrated set of instruments disclosed herein can be modified of substituted with known or yet unknown equivalents that may be developed in the future, or equivalents whose applicability as substitutes may be established in the future. The method described herein may be modified for various applications without departure from the essence and scope of the claimed invention, since the range of potential applications is broad, and they must be readily adaptable for its numerous variations.

As for single wall carbon nanotubes obtained using the method described herein, they are the subject of interest in numerous promising fields in material science, nanotechnology, nanoelectronics, applied chemistry and the like.

The unique properties of single wall carbon nanotubes improve the consumer performance of materials applied in various fields.

Fibrous composite materials and reinforced plastics, industrial coatings, automobile tires and rubber goods, structural materials and materials for electrochemical energy sources constitute a substantial volume of industrial consumption of single wall carbon nanotubes. Furthermore, single wall carbon nanotubes are used in adhesives and lubricants, antistatic plastics, transparent conductive films, and cable products.

Single wall carbon nanotubes provide technological benefits to rubber goods based on a wide range of rubbers, silicones, and thermoplastic elastomers. By improving the strength and elastic properties of rubber formulations, the graphene nanotubes allow you to preserve and in certain cases improve their other key properties: Shore hardness, cohesion strength, dynamic strength, abrasion resistance, reduced hysteresis losses, and product color stability. The use of single wall carbon nanotubes in automobile tires can substantially improve such key properties as wear resistance, fuel efficiency, adhesion properties, with the improvements being achieved at already very low concentrations of nanotubes, which lets you retain the core production technology.

The use of single wall carbon nanotubes in battery electrodes substantially improves their target parameters (storage density and the number of charge cycles), which have a direct impact on the service life of the energy sources. The main segments of this market are lithium-ion batteries for electric cars and renewable power sources, as well as batteries for laptops, mobile phones, and alkaline cells.

Single wall carbon nanotubes have an enormous potential for applications in the fibrous composite materials market. The main industries are alternative energy sources and infrastructure, automotive, and airplane manufacturing. These industries require light and strong materials with enhanced physical properties (wind generator blades, boat hulls, airplane components, pipes, structural elements, boats and the like).

Reinforced plastics also enjoy wide application in various fields. One of the problems of automotive industry is reduction of fuel consumption and battery load by decreasing the weight of all components of the car; for plastics to be used in aerospace applications, in addition to the requirements already mentioned, the resistance of material to extreme conditions and loads is also of key importance. All these problems can be solved with single wall carbon nanotubes.

In industrial coatings single wall carbon nanotubes are considered as a multifunctional additive for primers and paints used for coating vehicles (car and airplane bodies, boat hulls, and the like), equipment (electrical and consumer appliances) and reservoirs (e.g., for flammable products), as well as antistatic self-levelling floors used at production facilities.

In such structural materials as cement, bitumen, asphalt, concrete, metal-based composition materials, single wall carbon nanotubes provide a means to control the processes of structure formation in the material at the level of atoms and molecules, allowing you to obtain high quality products with predetermined performance characteristics.

Adding single wall carbon nanotubes to such products of the chemical industry as adhesives and glues, lubricating materials and sealants demonstrates a significant improvement in their mechanical properties and key physical features.

An increasing use of rigid and soft plastic packaging with antistatic properties is being observed in the electronics market. The introduction of single wall carbon nanotubes is the most cost-effective and easy to use solution: they have significant advantages over existing solutions, such as temporal antistatic additives and carbon black. There are many other plastic products that require antistatic properties: panel glides, frames of industrial fans, etc.

Transparent conductive films are used in electronic instruments, sensors, and photoelectric devices. The main material used to obtain transparent and conductive coatings is Indium Tin Oxide (ITO). Both the material and the technology for its production are quite expensive. Adding single wall carbon nanotubes allows you to obtain parameters on par with ITO while retaining the flexibility of the polymer substrate.

Single wall carbon nanotubes can be used in a significant share of cable products, for example, as a semi-conductive screen for cables. A material consisting exclusively of nanotubes is used as a substitute for copper braid in data cables for aviation, providing a significant reduction in aircraft weight.

The development of all these applications has been limited by the absence of technology for large-scale production of high quality single wall carbon nanotubes.

The method described herein made it possible to create an industrial plant for the production of single wall carbon nanotubes with an annual production rate of 15 tons per year, which, according to Future Markets, Inc., exceeds 90% of global production of this material [The Global Market for Single-Walled Carbon Nanotubes, Future Markets, January 2018, p. 19]. The creation of this plant has in turn given an impetus for the development of mass industrial application of single wall carbon nanotubes in various fields, such as, e.g., in the production of electroconductive polymer materials ["TUBALL Single Wall Nanotubes Offer Cost-effective Solutions" II Compounding World.—October 2016—pp. 34-35], electrochemical energy sources ["A Step Forward in the Evolution of Battery Energy Density" II Ees International.—23 Jan. 2017; "Single Wall Carbon Nanotubes Provide a Solution to the Energy Density Problem" II Zaryadka.—10 Aug. 2017], coatings ["Single Wall Carbon Nanotubes Looks Promising for Global Coating Industry" II Coatings World.—1 Jun. 2017;], polymer materials with enhanced physico-mechanical properties ["Added Value for Industrial Rollers with TUBALL" II JEC Composites.—14 Mar. 2018], reinforced glass products ["Industrial-Scale Production of Nano Spray Coated Glass Containers Launched in EKRAN Industrial Park" II Coatings World.—27 Mar. 2018], as well as numerous other applications ["TUBALL Nanotubes Provide Stable Anti-static Properties and Prolonged Cycle Life" II Composites Today.—22 Mar. 2018]. We note that TUBALL® is the trademark of the Applicant.

Therefore, having described the preferred embodiment, it will be appreciated by those skilled in the art that certain benefits of the disclosed method and apparatus have been achieved. In particular, those skilled in the art will appreciate that the proposed system and method ensure an efficient production of single wall carbon nanotubes at a low cost.

It will also be appreciated that numerous modifications, adaptations, and their alternative embodiments may be proposed within the essence and scope of the present invention. The invention is further defined by the following claims.

What is claimed is:

1. A method for producing single wall carbon nanotubes, the method comprising:
   (a) obtaining a vapor containing nanoparticles of a catalytic substance in an evaporation chamber;
   (b) obtaining a working mixture in a mixing node at 650-1,400° C. by delivering the vapor to the mixing node from the evaporation chamber in a carrier gas flow, and introducing gaseous hydrocarbons into the mixing node so that the working mixture includes the carrier gas, the gaseous hydrocarbons, and the nanoparticles, with the nanoparticles having an average size of 1-10 nm, and the single wall carbon nanotubes forming on the nanoparticles;
   (c) following (a) and (b), feeding the working mixture at 650-1,400° C. to a reaction chamber, the reaction chamber having a distance of at least 0.5 m between its opposite walls;
   (d) discharging the single wall carbon nanotubes from the reaction chamber in a stream of products of hydrocarbon decomposition;
   (e) filtering the single wall carbon nanotubes from the products of hydrocarbon decomposition.

2. The method of claim 1, wherein to deliver the vapor containing the nanoparticles to the mixing node, the vapor is mixed in the evaporation chamber with the carrier gas heated to 400-1,400° C.

3. The method of claim 1, wherein, during the preparation of the working mixture, the nanoparticles are covered with a graphene shell comprising several graphene layers.

4. The method of claim 1, wherein the working mixture is supplied to the reaction chamber at a mass rate of at least 10 g per minute.

5. The method of claim 1, wherein the nanoparticles are supplied to the reaction chamber at a mass rate of at least 1 g per minute.

6. The method of claim 1, wherein a residence time of the working mixture in the reaction chamber is 0.05 sec to 5 minutes.

7. The method of claim 1, wherein the gaseous hydrocarbons are any of:
   natural gas;
   methane;
   ethane;
   propane;
   butane;
   pentane;
   hexane;
   ethylene;
   propylene;
   aliphatic hydrocarbons;
   hydrocarbons with the number of carbons in the range of 7 to 10;
   mono- or bicyclic aromatic hydrocarbons with isolated or fused rings, and olefins $C_xH_{2x}$, where x is 2, or 3, or 4;
   vapor of anthracene or anthracene oil;

a hydrocarbon with a high-saturated vapor pressure;
ethyl alcohol; and
a mixture of hydrocarbons.

8. The method of claim 1, wherein the catalyst substance is selected from transition metals from Group 5B, Group 6B or Group 8, iron, or a combination of two, three, or more transition metals.

9. The method of claim 1, wherein the carrier gas is an inert gas, hydrogen, nitrogen, ammonia, alcohol vapor, or a combination of two, three, or more thereof.

10. The method of claim 1, wherein the vapor is pre-mixed with the gaseous hydrocarbons before mixing with the carrier gas.

11. The method of claim 1, wherein the gaseous hydrocarbons are pre-heated to at least 400° C.

12. The method of claim 1, wherein the single wall carbon nanotubes at step (e) are filtered so that bundles of the single wall carbon nanotubes with a length of more than 1 μm settle on a filter, and bundles of the single wall carbon nanotubes with a length of less than 1 μm largely pass through the filter and recirculate back to the mixing node in a waste gas stream.

13. The method of claim 1, wherein the method produces at least 2 kilograms of carbon nanostructures per hour, with the content of the single wall carbon nanotubes in the carbon nanostructures being at least 80 wt. %.

14. The method of claim 13, wherein a degree of carbon conversion into the single wall carbon nanotubes is at least 90 wt. %.

* * * * *